US008941507B2

(12) United States Patent
Carkner

(10) Patent No.: US 8,941,507 B2
(45) Date of Patent: Jan. 27, 2015

(54) AUTOMATIC FLIGHT-SAFE INDICATOR AND METHOD OF USE FOR BATTERIES

(75) Inventor: Steve Carkner, Ottawa (CA)

(73) Assignee: Panacis Inc., Ottawa, Ontario (CA)

( * ) Notice: Subject to any disclaimer, the term of this patent is extended or adjusted under 35 U.S.C. 154(b) by 112 days.

(21) Appl. No.: 13/508,029

(22) PCT Filed: Nov. 16, 2010

(86) PCT No.: PCT/IB2010/055204
§ 371 (c)(1),
(2), (4) Date: May 3, 2012

(87) PCT Pub. No.: WO2011/061682
PCT Pub. Date: May 26, 2011

(65) Prior Publication Data
US 2012/0249335 A1   Oct. 4, 2012

Related U.S. Application Data

(60) Provisional application No. 61/261,992, filed on Nov. 17, 2009.

(51) Int. Cl.
*G08B 21/00* (2006.01)
*H01M 10/48* (2006.01)
(52) U.S. Cl.
CPC .................................. *H01M 10/48* (2013.01)
USPC ........ 340/636.1; 340/439; 340/963; 340/970; 128/204.21; 136/244; 180/65.31; 307/149; 320/109; 320/118; 320/132; 429/159; 429/340; 701/3; 701/31.4
(58) Field of Classification Search
USPC ............... 340/439, 963, 970, 636.1; 136/244; 180/65.3; 320/109, 118, 132; 429/159; 701/3, 31.4; 128/204.21; 307/149
See application file for complete search history.

(56) References Cited

U.S. PATENT DOCUMENTS

| | | | | |
|---|---|---|---|---|
| 6,475,680 | B1 * | 11/2002 | Arai et al. | 429/340 |
| 7,002,265 | B2 * | 2/2006 | Potega | 307/149 |
| 7,509,957 | B2 * | 3/2009 | Duquette et al. | 128/204.21 |
| 2007/0164708 | A1 * | 7/2007 | Jiang | 320/132 |
| 2007/0208468 | A1 * | 9/2007 | Sankaran et al. | 701/29 |
| 2008/0042861 | A1 * | 2/2008 | Dacquay et al. | 340/636.1 |
| 2009/0066291 | A1 * | 3/2009 | Tien et al. | 320/118 |
| 2009/0109064 | A1 * | 4/2009 | Joyner | 340/970 |
| 2009/0266397 | A1 * | 10/2009 | Gibson et al. | 136/244 |
| 2010/0108415 | A1 * | 5/2010 | Tuli | 180/65.31 |
| 2010/0109856 | A1 * | 5/2010 | Kuenzner | 340/439 |
| 2010/0190049 | A1 * | 7/2010 | Kawase et al. | 429/159 |
| 2011/0071707 | A1 * | 3/2011 | Crumm et al. | 701/3 |
| 2011/0205089 | A1 * | 8/2011 | Knoop | 340/963 |
| 2012/0091958 | A1 * | 4/2012 | Ichikawa et al. | 320/109 |

* cited by examiner

*Primary Examiner* — Daniell L Negron
*Assistant Examiner* — Israel Daramola

(57) ABSTRACT

An flight-safe indicator for a battery displays the flight-safety state of a battery to be transported by an aircraft. The indicator can be easily recognized by ground personnel anywhere regardless of the language they speak or read. The indicator comprises an icon indicating that the battery is safe for flight and would be easily recognized by personnel at an airport. The icon would be placed on the battery or on the battery packaging prior to loading on the aircraft. When the magnitude of power stored on the battery exceeds a safety threshold, the icon changes to an indication that the battery is not safe for transporting by aircraft and the operator may discharge the battery using a load until it reaches a safe level.

19 Claims, 2 Drawing Sheets

AUTOMATIC FLIGHT-SAFE INDICATOR AND METHOD OF USE FOR BATTERIES

RELATED APPLICATIONS

This application claims the benefit of U.S. Provisional Patent Application No. 61/261,992 filed in the United States Patent and Trademark Office on Nov. 17, 2009.

FEDERAL FUNDING

N/A

TECHNICAL FIELD

This invention pertains to the field of batteries, and particularly to the transportation of batteries on board aircraft and specifically to an automatic flight-safe indicator and method of use for batteries.

Technical Problem

It is well understood that modern battery technologies have significant safety issues related to the energy stored within them. In particular, as the amount of energy increases with respect to the overall size of the battery, the overall energy density has reached a level where a damaged battery may overheat in a reaction that releases more total energy than can be accounted for strictly by the electrical energy stored within the battery system.

This type of event is often referred to as a thermal runaway event. In the case of Lithium Cobalt rechargeable batteries, this runaway reaction can occur at temperatures as low as 200 degrees centigrade for a fully charged battery. When thermal runaway is reached, chemical reactions occur inside the battery that are exothermic in nature, resulting in additional heat generation that can quickly lead to smoke, flame and ejection of molten metal. New chemistry blends and construction methods seek to increase the point at which the thermal runaway event will occur, but these efforts are constantly challenged by the ever increasing amounts of energy being stored.

Batteries are not normally subjected to temperatures high enough to cause thermal runaway. However, when a battery is damaged, high temperatures can be generated. For example, if an external short circuit is applied, if the battery is penetrated with a conductive object such as a nail, or if the battery is crushed. The electrical energy inside the battery is released into the damaged area generating significant heat, the more energy stored in the battery, the more heat is generated, and the more likely the battery is to experience a thermal runaway event.

Most lithium chemistries also have a variable thermal runaway point. The higher the voltage potential of the cells; then, the lower the thermal runaway point. A fully charged battery is therefore at significantly higher risk of catastrophic failure than a discharged battery.

It is expected that new battery technologies may suffer these same issues as Lithium Ion batteries.

Most countries have regulations that restrict the transportation of lithium batteries and other hazardous goods. In the case of lithium rechargeable batteries, these restrictions used to focus only on the amount of lithium used to manufacture the batteries. Many countries have changed this approach as batteries are generally not labeled with the amount of the lithium they contain. The International Air Transit Authority (IATA) has also put in place limits on the total watt-hours of energy the battery is capable of storing and requires this amount to be printed on the battery. Limits of 100 Watt-Hours are currently in place, but this amount is subject to change and may be increased to 160 Watt-hours with special permission.

There is an assumption that a smaller battery is automatically safer than a larger battery, and similarly that a large battery is automatically unsafe under all conditions.

There remains a need for manufactures to have the ability to calculate and indicate when a battery is safe for transportation.

It is common for advanced battery systems to have some form of display on the battery which is generally used to display battery capacity in terms of percent charge.

Technical Solution

In order to overcome the deficiencies noted above, I propose as a solution my invention, namely, an automatic flight-safe indicator for a battery. In one embodiment of the invention the automatic flight-safe indicator comprises a battery with a power storage magnitude indicator. The power storage magnitude indicator is electrically connected to the battery and displays a power storage magnitude of the battery. The power storage magnitude is displayed on the power storage magnitude indicator in graphical or numerical form and preferably as watt-hours.

In one embodiment of the invention the power storage magnitude indicator is back-lit by a light emitting diode.

In one embodiment of the invention the power storage magnitude indicator is rectangular and is disposed on the top surface of the battery.

A label is affixed to the battery next to the power storage magnitude indicator displaying a power storage magnitude flight-safety limit. This limit is set by a safety authority.

In an embodiment of the invention a human operator compares the power storage magnitude of the battery displayed on the power storage indicator to the power storage magnitude flight-safety limit. The battery is denied placement onboard an aircraft when the power storage magnitude of the battery is equal to or greater than the power storage magnitude flight-safety limit. The battery is permitted placement onboard an aircraft when the power storage magnitude of the battery is less than the power storage magnitude flight-safety limit.

In another embodiment of the invention the automatic flight-safe indicator further comprising a flight-safe icon electrically connected to the battery storage magnitude indicator. The icon has a first flight-safe display for indicating that the battery is safe for loading on an aircraft and a second flight-unsafe display for indicating that the battery is not safe for loading on an aircraft. The flight-safe icon receives a power storage magnitude indication from battery storage magnitude indicator. The flight-safe icon is programmed to change from the first flight-safe display to the second flight-unsafe display when the battery storage magnitude indication is equal to or greater than the power storage magnitude flight-safety limit.

In a preferred embodiment of the automatic flight-safe indicator icon the first flight-safe display comprises a silhouette of an aircraft within a circle. The first flight-safety display may is green or it may be back-lit green.

In a preferred embodiment of the invention the automatic flight-safe indicator icon second flight unsafe display comprises the silhouette of an aircraft within a circle having a diagonal bar. The second flight-unsafe display may be red or back-lit red.

A method of using an automatic flight-safe indicator for a battery comprises the following steps:

provide a battery having a power storage magnitude;

provide a battery power storage magnitude indicator electrically connected to the battery;

displaying the battery power storage magnitude of the battery as a numerical display; providing a human operator for comparing the numerical display to a predetermined power storage magnitude safety limit;

the human operator prohibits loading of the battery on board an aircraft when the predetermined power storage magnitude safety limit is exceed; and, the human operator permits loading of the battery on board the aircraft when the predetermined power storage magnitude safety limit is not exceeded.

A further method of using an automatic flight-safe indicator for a battery comprising the following steps:

provide a battery having a power storage magnitude;

provide a battery power storage magnitude indicator electrically connected to the battery;

displaying the battery power storage magnitude of the battery as a numerical display;

providing a flight-safe icon having a first flight-safe display and a second flight-unsafe display;

electrically connecting the flight-safe icon to the battery storage magnitude indicator;

programming the flight-safe icon to change from the first flight-safe display to the second flight-unsafe display when the battery storage indicator indicates battery power equal to or greater than a predetermined battery storage magnitude safety limit;

providing a human operator for observing the flight-safety icon;

the human operator prohibits loading of the battery on board an aircraft when the flight-safety icon is in the flight-unsafe display; and, the human operator permits loading of the battery on board the aircraft when the flight-safety icon is in the flight-safe display.

If the human operator wishes to take the battery on board a flight, but the battery storage indicator is too high, the human operator may install the battery in the equipment it is designed to power in order to discharge the battery or may attach any other external load to the battery to reduce the power stored.

In another embodiment of the invention, a load may be integrated into the battery and connected through a switch, software control or other method such that the human operator can instruct the battery to dissipate energy into the integrated load until such time as the battery reaches the flight-safe level of storage.

DETAILED DESCRIPTION

The present invention is a flight-safe indicator easily displaying the flight-safety state of a battery to be transported by an aircraft that can be easily recognized by ground personnel anywhere regardless of the language they speak or read.

Figure 1:
FIG. 1 shows the flight-safe icon in a first flight-safe display.

Referring to FIG. 1, there is shown an icon indicating that the battery is safe for flight and would be easily recognized by personnel at an airport. The icon would be placed on the battery or on the battery packaging prior to loading on the aircraft.

A number of different icons could be used to convey similar information and such indication could also include text.

Figure 2:
FIG. 2 shows the flight-safe icon in a second flight-unsafe display.

Referring to FIG. 2, the concept of the battery being flight-safe can also be considered in reverse, showing a flight-unsafe icon when the battery contains too much energy to be safely taken on board aircraft. The unsafe symbol would simply be extinguished to indicate that it is in a safe state.

The current IATA requirements force manufacturers to label their battery with a watt-hour rating. This label is inspected, at the airport, and if it is less than 100 watt-hours (or other limit as may be set by appropriate authorities and changed from time to time) then the battery is allowed on the aircraft. However, battery capacity changes depending on how it is charged and how new the battery is. It is common for batteries to have as much as 20% higher capacity when new then their nominal rating. Therefore, a printed label affixed to the battery may mislead authorities into allowing an unsafe battery onboard the aircraft.

Figure 3:
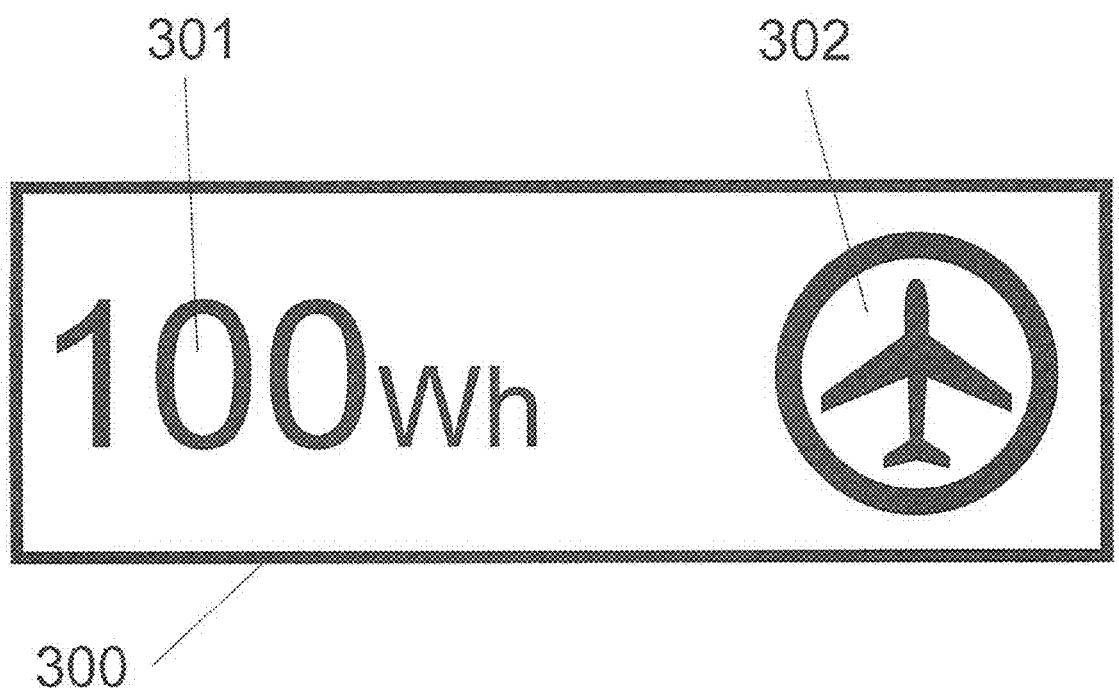
FIG. 3 illustrates a power storage magnitude display in watt-hours.

FIG. 3 shows a battery display (300) which shows the actual watt-hours of energy stored (301) in the battery and also includes the flight safe icon (302). The actual rated watt-hour capacity of the battery may be greater or less than the number displayed on the battery. In the case of a large battery, for example a 200 watt-hour battery, the user can attach a load to the battery to discharge it below the 100 watt-hour limit imposed by the IATA and other authorities, which will allow the battery to be taken on board aircraft. The load could be attached manually using an external load or device, or the load could be integrated into the battery and coupled such that the user could close a switch or push a button that would instruct the battery to dissipate energy until the flight-safe level of power stored was reached.

The manufacturer also has the opportunity to increase overall aircraft safety by imposing a lower limit on the safe capacity for flight. For example, if the battery was rated for an absolute maximum capacity of 80 watt-hours, then fully charging the battery to 80 watt-hours before taking on board an aircraft is in fact putting the battery into its most dangerous condition. Through appropriate levels of short circuit and abuse testing, a manufacturer can determine how much energy can be safely stored inside the battery to satisfy the manufacturers own tolerance for risk and reduce the chance of any safety event occurring.

A battery safety event such as a minor gas venting will be far more severe when it occurs in the confines of an aircraft. Therefore, in the example above, the manufacturer may require than an 80 watt-hour battery be discharged below 40 watt-hours of energy stored before the flight-safe icon is shown, even though this limit is far below the limits actually imposed by the transit authorities.

Although the description above contains much specificity, these should not be construed as limiting the scope of the invention but as merely providing illustrations of the presently preferred embodiment of this invention. Thus the scope of the invention should be determined by the appended claims and their legal equivalents.

What is claimed is:

1. An automatic flight-safe indicator for detecting a safety level in a battery to be transported on board an aircraft, the indicator comprising:

a) a power storage magnitude indicator for the battery, said power storage magnitude indicator electrically connected to the battery for displaying a power storage magnitude of the battery; and b) a flight-safe indicator electrically connected to the storage magnitude indicator;

the flight-safe indicator being activated based on i) a battery type and ii) the power storage magnitude of the battery is below a threshold safe power storage magnitude for the battery type.

2. The automatic flight-safe indicator of claim 1, wherein the power storage magnitude is displayed on the power storage magnitude indicator in numerical form.

3. The automatic flight-safe indicator of claim 2, wherein the power storage magnitude is displayed on the power storage magnitude indicator in watt-hours.

4. The automatic flight-safe indicator of claim 1, further including a label affixed to the battery displaying a power storage magnitude flight-safety limit.

5. The automatic flight-safe indicator of claim 4, wherein the power storage magnitude of the battery displayed on the power storage indicator is compared to the power storage magnitude flight-safety limit.

6. The automatic flight-safe indicator of claim 5, wherein the battery is positioned outside of an aircraft when the power storage magnitude of the battery is equal to or greater than the power storage magnitude flight-safety limit.

7. The automatic flight-safe indicator of claim 5, wherein the battery is positioned onboard an aircraft when the power storage magnitude of the battery is less than or equal to the power storage magnitude flight-safety limit.

8. The automatic flight-safe indicator of claim 1, wherein the power storage magnitude indicator is powered by the battery.

9. The automatic flight-safe indicator of claim 1, further comprising a flight-safe icon electrically connected to the battery storage magnitude indicator.

10. The automatic flight-safe indicator of claim 9, wherein the flight-safe icon has a first flight-safe display for indicating that the battery is safe for loading on an aircraft and a second flight-unsafe display for indicating that the battery is not safe for loading on an aircraft.

11. The automatic flight-safe indicator of claim 10, wherein the flight-safe icon receives a power storage magnitude indication from battery storage magnitude indicator.

12. The automatic flight-safe indicator of claim 11, wherein the flight-safe icon is programmed to change from the first flight-safe display to the second flight-unsafe display when the battery storage magnitude indication is equal to or greater than a power storage magnitude flight-safety limit.

13. The automatic flight-safe indicator of claim 12, wherein the first flight-safe display comprises a silhouette of an aircraft within a circle.

14. The automatic flight-safe indicator of claim 12, wherein the first flight-safety display is green.

15. The automatic flight-safe indicator of claim 12, wherein the second flight-unsafe display comprises the silhouette of an aircraft within a circle having a diagonal bar.

16. The automatic flight-safe indicator of claim 12, wherein the second flight-unsafe display is red.

17. The automatic flight-safe indicator of claim 1 wherein the battery comprises an integrated load operatively connected to allow the operator to discharge the battery into the load until said power storage magnitude is reduced to a flight-safe level.

18. The flight-safe indication of claim 1 wherein the battery is to be transported as cargo or as part of a passenger's personal effects.

19. A method of using an automatic flight-safe indicator for detecting a safety level in a battery to be transported on board an aircraft comprising the following steps:
a) providing a battery having a power storage magnitude;
b) providing a battery power storage magnitude indicator electrically connected to the battery;
c) displaying said battery power storage magnitude;
d) providing a flight-safe indicator having a first flight-safe display and a second flight-unsafe display, wherein the flight-safe indicator is activated based on
 i. a battery type, and
 ii. the power storage magnitude of the battery being below a threshold safe power storage magnitude for the battery type;
e) electrically connecting a flight-safe icon to the battery storage magnitude indicator;
f) programming the flight-safe icon to change from the first flight-safe display to the second flight-unsafe display when the battery storage indicator indicates battery power equal to or greater than a predetermined battery storage magnitude safety limit;
g) providing a human operator for observing the flight-safety icon;
h) the human operator prohibiting loading of the battery on board an aircraft when the flight-safety icon is in the flight-unsafe display; and
i) the human operator permitting loading of the battery on board the aircraft when the flight-safety icon is in the flight-safe display.

* * * * *